US009006132B2

United States Patent
Ryu et al.

(10) Patent No.: US 9,006,132 B2
(45) Date of Patent: Apr. 14, 2015

(54) PROCESS FOR PREPARING CATALYST COMPOSITION FOR THE SYNTHESIS OF CARBON NANOTUBE WITH HIGH YIELDS USING THE SPRAY PYROLYSIS METHOD

(75) Inventors: Sang-Hyo Ryu, Daejeon (KR); Hyun-Kyung Sung, Daejeon (KR); Namsun Choi, Daejeon (KR); Wan Sung Lee, Daejeon (KR); Dong Hwan Kim, Daejeon (KR); Youngchan Jang, Daejeon (KR)

(73) Assignee: Korea Kumho Petrochemical Co., Ltd, Seoul (KR)

( * ) Notice: Subject to any disclaimer, the term of this patent is extended or adjusted under 35 U.S.C. 154(b) by 988 days.

(21) Appl. No.: 13/105,663

(22) Filed: May 11, 2011

(65) Prior Publication Data

US 2012/0040186 A1    Feb. 16, 2012

(30) Foreign Application Priority Data

Aug. 10, 2010    (KR) .................. 10-2010-0076674

(51) Int. Cl.
*B01J 23/58*    (2006.01)
*B82Y 40/00*    (2011.01)
(Continued)

(52) U.S. Cl.
CPC .............. *B82Y 40/00* (2013.01); *Y10T 428/298* (2015.01); *B01J 23/745* (2013.01); *B01J 23/75* (2013.01);
(Continued)

(58) Field of Classification Search
CPC ...... B82Y 40/00; B82Y 30/00; D01F 9/1273; D01F 9/12; D01F 9/127; B01J 23/75; B01J 23/745; B01J 23/8872; B01J 35/002; B01J 23/78; B01J 37/082

USPC ................. 502/306, 328, 324, 325, 338, 340; 423/447.4, 447.2, 447.1, 447.3, 455; 977/896, 752, 742, 740, 840, 842

See application file for complete search history.

(56) References Cited

U.S. PATENT DOCUMENTS 6,696,387 B1    2/2004   Moy et al.
2009/0087372 A1*  4/2009  Buchholz et al. .......... 423/447.2
(Continued)

FOREIGN PATENT DOCUMENTS

KR    10-2007-82141    8/2007
KR    10-2007-110739   11/2007
KR    10-913369        6/2009

*Primary Examiner* — Colleen Dunn
*Assistant Examiner* — Haytham Soliman
(74) *Attorney, Agent, or Firm* — Sterne, Kessler, Goldstein & Fox P.L.L.C.

(57) ABSTRACT

The present invention relates to a process for preparing catalyst composition for the synthesis of carbon nanotube with high yields using the spray pyrolysis method. More particularly, this invention relates to a process for preparing catalyst composition for the synthesis of carbon nanotube comprising the steps of i) dissolving multi-component metal precursors of catalyst composition in de-ionized water; ii) spraying obtained catalytic metal precursor solution into the high temperature reactor by gas atomization method; iii) forming the catalyst composition powder by pyrolysis of gas atomized material; and iv) obtaining the catalyst composition powder, wherein said catalyst composition comprises i) main catalyst selected from Fe or Co, ii) Al, iii) optional co-catalyst at least one selected from Ni, Cu, Sn, Mo, Cr, Mn, V, W, Ti, Si, Zr or Y, iv) inactive support of Mg. Further, the catalyst composition prepared by this invention has a very low apparent density of 0.01~0.50 g/ml as well as the catalyst composition affords high production yield (1,000~1,800%) of carbon nanotube.

4 Claims, 2 Drawing Sheets

(51) Int. Cl.
 *B01J 23/745* (2006.01)
 *B01J 23/75* (2006.01)
 *B01J 23/78* (2006.01)
 *B01J 23/887* (2006.01)
 *B01J 35/00* (2006.01)
 *B01J 37/08* (2006.01)
 *B82Y 30/00* (2011.01)
 *D01F 9/12* (2006.01)
 *D01F 9/127* (2006.01)

(52) U.S. Cl.
 CPC .............. *B01J 23/78* (2013.01); *B01J 23/8872* (2013.01); *B01J 35/002* (2013.01); *B01J 37/082* (2013.01); *B82Y 30/00* (2013.01); *D01F 9/12* (2013.01); *D01F 9/127* (2013.01); *D01F 9/1273* (2013.01); *Y10S 977/74* (2013.01); *Y10S 977/742* (2013.01); *Y10S 977/84* (2013.01); *Y10S 977/842* (2013.01)

(56) References Cited

U.S. PATENT DOCUMENTS

2010/0143235 A1* 6/2010 Jeong et al. ............... 423/447.4
2010/0207053 A1  8/2010 Ryu

* cited by examiner

PROCESS FOR PREPARING CATALYST COMPOSITION FOR THE SYNTHESIS OF CARBON NANOTUBE WITH HIGH YIELDS USING THE SPRAY PYROLYSIS METHOD

BACKGROUND OF THE INVENTION

1. Field of the Invention

The present invention relates to a process for preparing catalyst composition for the synthesis of carbon nanotube with high yields using the spray pyrolysis method. More particularly, this invention relates to a process for preparing catalyst composition for the synthesis of carbon nanotube comprising the steps of i) dissolving multi-component metal precursors of catalyst composition in de-ionized water; ii) spraying obtained catalytic metal precursor solution into the high temperature reactor by gas atomization method; iii) forming the catalyst composition powder by pyrolysis of gas atomized material; and iv) obtaining the catalyst composition powder, wherein said catalyst composition comprises i) main catalyst selected from Fe or Co, ii) Al, iii) optional co-catalyst at least one selected from Ni, Cu, Sn, Mo, Cr, Mn, V, W, Ti, Si, Zr or Y, iv) inactive support of Mg. Further, the catalyst composition prepared by this invention has a very low apparent density of 0.01~0.50 g/ml as well as the catalyst composition affords high production yield (1,000~4,800%) of carbon nanotube.

2. Description of Prior Art

Carbon nanotube has a hexagonal honey comb shape in which one carbon atom is bonded with 3 adjacent carbon atoms. Further, the graphite plane is rolled in a round shape having nano size diameter. Specific physical properties are shown according to the size and shape of carbon nanotube. The weight of carbon nanotube is comparatively light due to its hollow structure. Further, the electrical conductivity is as good as that of copper as well as the thermal conductivity is as good as that of diamond. Of course, the tensile strength is not less than that of iron. Carbon nonotube can be classified as single walled carbon nanotube, multi-walled carbon nanotube and rope carbon nanotube depending on its rolled shape.

Such carbon nanotube can be generally manufactured by an arc-discharge method, a laser vaporization method, a plasma enhanced chemical vapor deposition method, a thermal chemical vapor deposition method, a vapor phase growth method or a electrolysis method. Among them, a thermal chemical vapor deposition method has been preferably used, because the growth of carbon nanotube can be made by the direct reaction between carbon source gas and metal catalyst without using the substrate. Further, high purity of carbon nanotube can be economically manufactured in a large amount according to a thermal chemical vapor deposition method.

In a thermal chemical vapor deposition method, the metal catalyst is necessarily required. Among the metals, Ni, Co, or Fe has been commonly used. Each particle of metal catalysts can act as seed for the formation of carbon nanotube. Therefore, the metal catalyst has been required to be formed as nano size particle. Of course, many researches for developing metal catalyst have been tried.

As a preparation method of metal catalyst reported until now, following preparation methods have been disclosed. First, the method comprising i) preparing the solution containing catalytic metals and support, ii) co-precipitating the catalyst composition by adjusting pH, temperature and/or amount of ingredients, and iii) heat treating the precipitates under air or other gas atmosphere has been disclosed. Second, the method by drying or evaporating the suspension containing catalytic metal and fine grain support has been disclosed. Third, the method comprising i) ionizing the metal by mixing catalytic metal salt with cation particle support such as zeolite, and ii) reducing the ionized metal into metal particle by hydrogen or other reducing agent at high temperature has been disclosed. Finally, the method by calcinating catalytic metal with solid oxide support material, such as, magnesia, alumina and/or silica has been disclosed.

According to a catalytic chemical vapor deposition method, the metal catalytic components are slowly consumed in the process of synthesizing carbon nanotube. This consumption of metal catalytic components is caused by the inactivation of metal components by encapping, where carbon atoms encapsulate metal catalytic particle. Generally, re-activation of inactivated catalytic metal is neither possible, nor economical. In some cases, only few grams of carbon nanotube can be obtained using 1 gram of a metal catalyst composition including metal catalyst and support material. Therefore, the development of a high yield metal catalyst composition and of synthetic conditions has been required in order to produce the carbon nanotube in a commercially available scale Following technologies have been reported in patent disclosures or references until now.

In U.S. Pat. No. 6,696,387 by Hyperion Catalysis International Inc., the catalyst composition comprising i) Fe as main catalyst, ii) alumina and/or magnesia particle as catalyst support and iii) at least one optional co-catalyst selected from V, Nb, Ta, Cr, Mo, W, Mn, Tc, Re, Ru, Os, Co, Rh, Ir, Ni, Pd, Pt or the lanthanides has been disclosed. However, it is hard to obtain a precise multi-walled carbon nanotube with a high catalytic yield using this catalyst composition, because the uniform dispersion between metal catalyst and support material cannot be accomplished due to the use of alumina and/or magnesia support material.

In Korean early patent publication No. 10-2007-82141 'Process for preparing catalyst for the synthesis of carbon nanotube', a process for preparing catalyst for the synthesis of carbon nanotube comprising the steps of i) preparing transition metal precursor solution after dissolving transition metal precursor with solvent; ii) absorbing the transition metal precursor into the surface of solid oxide support; and iii) fixing the transition metal into the surface of support by spray pyrolysis of obtained solution in previous step has been disclosed. However, the use of solid oxide support selected from zeolite, silica, magnesia, zirconia and/or mixture of them inhibits uniform dispersion of metal catalyst composition. Further, the solid oxide support causes the closing of spray nozzle in the course of spray pyrolysis. Therefore, this preparation method has a handicap of commercialization.

In Korean early patent publication No. 10-2007-110739 'Process for preparing catalyst for the synthesis of carbon nanotube and an apparatus thereof', a process for preparing catalyst for the synthesis of carbon nanotube comprising the steps of i) preparing metal catalyst solution after dissolving metal precursor and support material precursor with solvent; ii) making a mist phase of metal catalyst solution by ultrasonic spray method; iii) forming the catalyst-support conjugate powder by pyrolysis of obtained mist phase of metal catalyst solution; and iv) obtaining the catalyst support conjugate powder has been disclosed. However, the use of ultrasonic spray causes partly education of metal precursor as well as change of metal ratio in catalyst solution. Further, the educated material causes the closing of spray nozzle in the course of spray pyrolysis. Therefore, this preparation method also has a handicap of commercialization.

In Korean patent No. 10-913369, 'Apparatus for manufacturing catalyst for carbon nanotube using spray pyrolysis method and method for preparing catalyst' a process for preparing catalyst for the synthesis of carbon nanotube comprising the steps of i) adding Fe, Ni, Co or its precursor; Al or its precursor; Mg or its precursor; and Mo or its precursor respectively into ammonia water; ii) mixing the said components in ammonia water; iii) drying and calcinating the catalyst components at high temperature after spraying the mixed component in a liquid state; and iv) obtaining the dried catalyst powder has been disclosed.

However, this preparation method of catalyst for carbon nanotube has following handicaps; i) forming the precipitate in the course of preparing multi component catalyst solution by mixing catalyst metal and ammonia water due to the reaction between catalyst metal precursors and ammonia; and ii) closing the spray nozzle or hindering the spray of nozzle by such precipitate.

Therefore, the present invention has been developed to overcome above problems in the course of preparing catalyst for carbon nanotube according to spray pyrolysis method. In other words, this invention has prevented following problems of spray pyrolysis method; i) the difficulty of uniform dispersion of metal catalyst onto a support material when solid oxide support powder is used and the closing of spray nozzle by support powder in the course of spray pyrolysis method; ii) the closing or hindering the spray nozzle by precipitate which is formed when ammonia water is used as a solvent.

Therefore, the inventors of present application have made the uniform dispersion of metal catalyst using an aqueous solution in which all components of metal catalyst are completely dissolved without any raw materials which result in precipitation and support powder. Further, the present preparation method of catalyst for the synthesis of carbon nanotube has accomplished the mass production of catalyst composition in a high yield in economical way, by solving the conventional problems of spray pyrolysis method, for example, closing or hindering the spray nozzle, additional apparatus or processing step for preparing catalyst, such as ultrasonic spray.

Further, the catalyst composition for the synthesis of carbon nanotube according to present spray pyrolysis method can afford a very low apparent density of 0.01~0.50 g/ml as well as a high production yield (1,000~1,800%) of carbon nanotube.

SUMMARY OF THE INVENTION

The object of present invention is to provide a process for preparing catalyst composition having the apparent density of 0.01~0.50 g/ml for the synthesis of carbon nanotube in a high yield of 1,000~1,800% comprising the steps of:
i) dissolving multi-component metal precursors of catalyst composition in de-ionized water; ii) spraying obtained catalytic metal precursor solution into the high temperature reactor by gas atomization method using the air of 2~5 atm pressure; iii) forming the catalyst composition powder by pyrolysis of gas atomized material at the temperature in the range of 600~1,200° C.; and iv) obtaining the catalyst composition powder,
wherein said catalyst composition comprises a) main catalyst selected from Fe or Co, b) Al, c) optional co-catalyst at least one selected from Ni, Cu, Sn, Mo, Cr, Mn, V, W, Ti, Si, Zr or Y, d) inactive support of Mg.

Further, the said metal precursor is at least one selected from nitrate, sulfate, alkoxide and/or carbonate form of metal.

Further, the said pyrolysis has been performed at the temperature in the range of 600~1,000° C.

Further, the said pyrolysis has been performed at the pressure of spray gas in the range of 2~4 atmosphere and the spray gas is air.

Further, the apparent density of catalyst composition is in the range of 0.03~0.40 g/ml.

Further, another object of present invention is to provide a catalyst composition prepared by said method, wherein the apparent density of catalyst composition is in the range of 0.01~0.50 g/ml, and the synthesis of carbon nanotube in a high yield of 1,000~1,800%.

Further, the other object of present invention is to provide a carbon nanotube produced by using the catalyst composition obtained from said preparation method.

Further, said carbon nanotube has a diameter of 5~20 nm and an aspect ratio of 100~10,000 in the form of multi walled carbon nanotube.

DETAILED DESCRIPTION OF THE INVENTION

Figure 1:
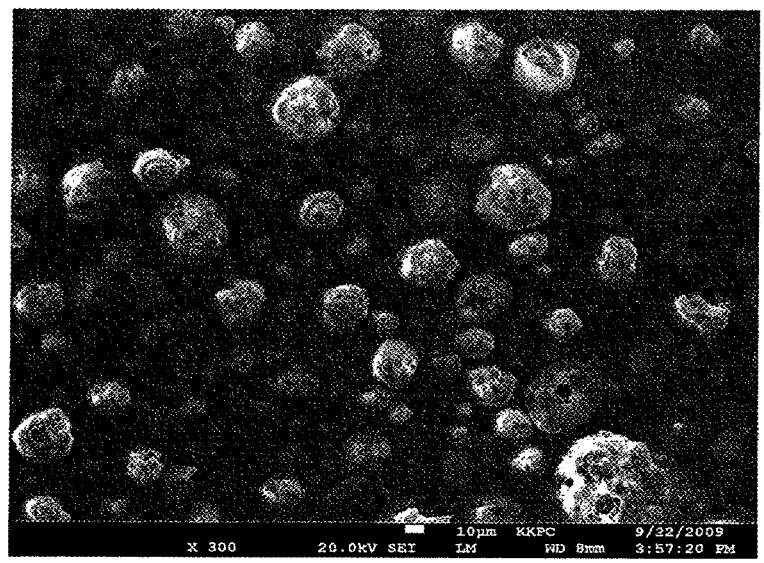
FIG. 1 shows a FE-SEM (Scanning Electron Microscope) photograph of catalyst composition prepared in Example 1.
Figure 2:
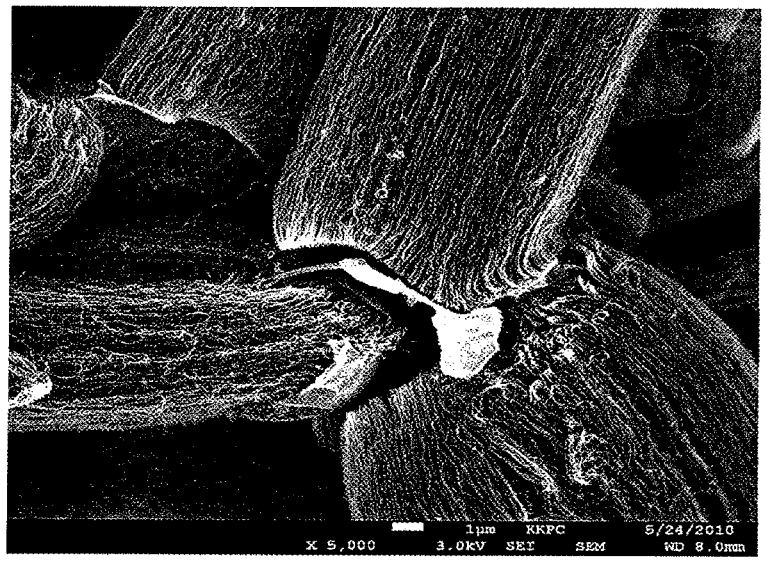
FIG. 2 shows a FE-SEM (Scanning Electron Microscope) photograph of carbon nanotube prepared in Example 2.
Figure 3:
FIG. 3 shows a HR-TEM (Transmission Electron Microscope) photograph of carbon nanotube prepared in Example 2.

Present invention relates to a process for preparing catalyst composition having the apparent density of 0.01~0.50 g/ml for the synthesis of carbon nanotube in a high yield of 1,000~1,800% comprising the steps of: i) dissolving multi-component metal precursors of catalyst composition in de-ionized water; ii) spraying obtained catalytic metal precursor solution into the high temperature reactor by gas atomization method using the air of 2~5 atm pressure; iii) forming the catalyst composition powder by pyrolysis of gas atomized material at the temperature in the range of 600~1,200° C.; and iv) obtaining the catalyst composition powder, wherein said catalyst composition comprises a) main catalyst selected from Fe or Co, b) Al, c) optional co-catalyst at least one selected from Ni, Cu, Sn, Mo, Cr, Mn, V, W, Ti, Si, Zr or Y, d) inactive support of Mg.

Further, the metal precursor used in present preparation method is at least one selected from nitrate, sulfate, alkoxide and/or carbonate form of metal. Preferably, the metal precursor can be used in the form of nitrate salt.

Further, the pyrolysis of present preparation method has been performed at the temperature in the range of 600~1,200° C. Preferably, the temperature is in the range of 600~1,000° C.

Further, the apparent density of obtained catalyst composition is in the range of 0.01~0.50 g/ml, preferably, 0.03~0.40 g/ml.

The transferring gas to be used for gas spray of catalytic metal precursor solution is an air. The pressure of transferring gas is in the range of 2~5 atm, preferably 2~4 atm.

Optimal catalyst composition used in this preparation method has been disclosed in our previous U.S. patent Ser. No. 12/472,925 'Catalyst composition for the synthesis of thin multi-walled carbon nanotube and its manufacturing method' and U.S. patent Ser. No. 12/836,014 'Catalyst composition for the synthesis of thin multi-walled carbon nanotube'.

In U.S. patent Ser. No. 12/472,925, the catalyst composition for producing carbon nanotube represented by following formula has been disclosed.

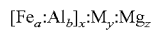

wherein

Fe represents catalytic metal of iron, its oxide, or its derivative; Al represents catalytic metal of aluminum, its oxide, or its derivative;

Mg represents inactive support of magnesium, its oxide, or its derivative;

M represents at least one transition metal selected from Co, Ni, Cr, Mn, Mo, W, V, Sn, or Cu, its oxide, or its derivative.

x, y, and z represent molar fraction of [the sum of Fe and Al], M, and Mg, x+y+z=10, 2.0≤x≤8.0, 0.0≤y≤2.5, 0.5≤z≤8.0.

a and b represent molar fraction of Fe and Al, a+b=10, 2.0≤a≤5.5, 4.5≤b≤8.0.

Further, in U.S. patent Ser. No. 12/836,014, the catalyst composition for producing carbon nanotube represented by following formula has been disclosed.

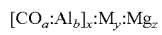

wherein

Co represents catalytic metal of cobalt, its oxide, or its derivative; Al represents catalytic metal of aluminum, its oxide, or its derivative;

Mg represents inactive support of magnesium, its oxide, or its derivative;

M represents at least one transition metal selected from Ni, Cr, Mn, Mo, W, Pb, Ti, Sn, or Cu, its oxide, or its derivative.

x, y, and z represent molar fraction of [the sum of Co and Al], M, and Mg, x+y+z=10, 2.0≤x≤9.9, 0.0≤y≤2.5, 0.1≤z≤8.0.

a and b represent molar fraction of Co and Al, a+b=10, 4.0≤a≤8.0, 2.0≤b≤6.0.

In a preparation method of carbon nanotube, the supply of a catalyst composition and the recovery of carbon nanotube can be carried out in a continuous or discontinuous process. For the synthesis of carbon nanotube, carbon source gas, such as, methane, ethane, propane, butane, ethylene, propylene, butene, or butadiene has to be supplied. Of course, hydrogen gas or inert gas can be supplied together with carbon source gas. The reaction can be performed under the pressure of 0.1~2 bar as well as at the temperature of 500~900° C. However, the reaction conditions have to be controlled to make a deposition of carbon in an appropriate rate without auto-decomposition of gas phase hydrocarbon. The preferred reaction temperature is 500~800° C.

According to the preparation method of present invention, carbon nanotube having 5~20 nm of diameter can be prepared.

The obtained carbon nanotube of present invention can be used as electrical conductive and strength enhanced filler in polymer composite material, thermal conductive and strength enhanced filler in metal composite, catalyst support of fuel cell, support material of organic process catalyst, storage material for methane and hydrogen gas, electrode material of lithium secondary battery, conductive material of lithium secondary battery, electrode material for high capacity electric double layer capacitor, field emitting material for display, and membrane material.

The outstanding advantageous effect of present invention is to provide a multi-walled carbon nanotube having 5~20 nm of diameter and 100~10,000 of aspect ratio in a high yield.

Further, the other outstanding advantageous effect of present invention is to provide a simple process for preparing a catalyst composition. Due to the simple preparation step of a catalyst composition and high catalytic yield of present invention, the production cost of carbon nanotube can be reduced. Further, the reduced cost for producing carbon nanotube affords that carbon nanotube can be applied in various fields in an economical manner.

The present invention can be explained more concretely by following Examples and Comparative Examples. However, the scope of the present invention shall not be limited by following Examples.

EXAMPLES

Preparation Example 1

Preparation of Catalyst Composition for the Synthesis of Carbon Nanotube

Catalyst 1 (Fe:Al:Mg=2.4:4.9:2.7)

The catalytic metal precursor solution has been prepared after adding 3,472 g of $Fe(NO_3)_3 \cdot 9H_2O$, 6,674 g of $Al(NO_3)_3 \cdot 9H_2O$ and 2,531 g of $Mg(NO_3)_2 \cdot 6H_2O$ into 10 L of de-ionized water and stirring the mixture for 2 hours at room temperature. Obtained catalytic metal precursor solution has been transferred by amount of 3 L/hour and sprayed into reactor by gas atomization method. Then, the pyrolysis of sprayed catalytic metal precursor solution has been made for 120 minutes continuously in the pyrolysis reactor. The pressure of air was 3 atm and the temperature of inner part of reactor was 750° C. The total amount of obtained catalyst composition was 576 g. The molar ratio of metal used in catalyst composition was Fe:Al:Mg=2.4:4.9:2.7. Further, the apparent density of obtained catalyst composition was 0.26 g/mL.

Preparation Example 2

Preparation of Catalyst Composition for the Synthesis of Carbon Nanotube

Catalyst 2 (Fe:Al:Mg=3.2:6.6:0.2)

The catalytic metal precursor solution has been prepared after adding 4,297 g of $Fe(NO_3)_3 \cdot 9H_2O$, 8,259 g of $Al(NO_3)_3 \cdot 9H_2O$ and 127 g of $Mg(NO_3)_2 \cdot 6H_2O$ into 10 L of de-ionized water and stirring the mixture for 2 hours at room temperature. Obtained catalytic metal precursor solution has been transferred by amount of 3.5 L/hour and sprayed into reactor by gas atomization method. Then, the pyrolysis of sprayed catalytic metal precursor solution has been made for 90 minutes continuously in the pyrolysis reactor. The pressure of air was 2.5 atm and the temperature of inner part of reactor was 750° C. The total amount of obtained catalyst composition was 444 g. The molar ratio of metal used in catalyst composition was Fe:Al:Mg=3.2:6.6:0.2. Further, the apparent density of obtained catalyst composition was 0.073 g/mL.

Preparation Example 3

Preparation of Catalyst Composition for the Synthesis of Carbon Nanotube

Catalyst 3 (Fe:Al:Co:Mg=2.1:4.5:0.6:2.8)

The catalytic metal precursor solution has been prepared after adding 3,038 g of $Fe(NO_3)_3 \cdot 9H_2O$, 5,839 g of $Al(NO_3)_3 \cdot 9H_2O$, 593 g of $Co(NO_3)_2 \cdot 6H_2O$ and 2,531 g of $Mg(NO_3)_2 \cdot 6H_2O$ into 10 L of de-ionized water and stirring the mixture for 2 hours at room temperature. Obtained catalytic metal precursor solution has been transferred by amount of 3.5 L/hour and sprayed into reactor by gas atomization method. Then, the pyrolysis of sprayed catalytic metal precursor solution has been made for 120 minutes continuously in the pyrolysis reactor. The pressure of air was 2 atm and the temperature of inner part of reactor was 750° C. The total amount of obtained catalyst composition was 406 g. The molar ratio of metal used in catalyst composition was Fe:Al:Co:Mg=2.1:4.5:0.6:2.8. Further, the apparent density of obtained catalyst composition was 0.23 g/mL.

Preparation Example 4

Preparation of Catalyst Composition for the Synthesis of Carbon Nanotube

Catalyst 4 (Fe:Al:Mo:Mg=3.1:6.3:0.4:0.2)

The catalytic metal precursor solution has been prepared after adding 2,897 g of $Fe(NO_3)_3.9H_2O$, 5,569 g of $Al(NO_3)_3.9H_2O$ 5569 g and 95 g of $Mg(NO_3)_2.6H_2O$ into 9 L of de-ionized water. On the other hand, Mo precursor solution has been prepared after adding 166 g of $(NH_4)_6Mo_7O_{24}.4H_2O$ into 2.5 L of de-ionized water and stirring the mixture for 2 hours at room temperature. Obtained Mo precursor solution has been added slowly without formation of precipitate into the catalytic metal precursor solution. The obtained mixed catalytic metal solution has been transferred by amount of 3.5 L/hour and sprayed into reactor by gas atomization method. Then, the pyrolysis of sprayed catalytic metal solution has been made for 120 minutes continuously in the pyrolysis reactor. The pressure of air was 2.5 atm and the temperature of inner part of reactor was 750° C. The total amount of obtained catalyst composition was 672 g. The molar ratio of metal used in catalyst composition was Fe:Al:Mo:Mg=3.1:6.3:0.4:0.2. Further, the apparent density of obtained catalyst composition was 0.073 g/mL.

Comparative Preparation Example 1

Preparation of Catalyst Composition for the Synthesis of Carbon Nanotube

Catalyst 5 (Fe:Al:Mg=2.4:4.9:2.7)

The Solution A has been prepared after adding 1,736 g of $Fe(NO_3)_3.9H_2O$, 3,337 g of $Al(NO_3)_3.9H_2O$ and 1,266 g of $Mg(NO_3)_2.6H_2O$ into 5 L of de-ionized water and stirring the mixture for 2 hours at room temperature. The Solution B has been prepared after adding 3,135 g of $NH_4.HCO_3$ into 10 L of de-ionized water and stirring the mixture for 2 hours at room temperature. Then, Solution A and Solution B have been mixed and stirred for 60 minutes in the room temperature. Obtained solid has been filtered and washed with de-ionized water. The recovered filter cake has been dried for 12 hours at 120° C. Then, the dried filter cake has been crushed, followed by calcinating it for 4 hours at 600° C. under air atmosphere. The calcinated powder has been crushed one more time. Finally, 1,120 g of catalyst composition has been obtained. The molar ratio of metal used in catalyst composition was Fe:Al:Mg=2.4:4.9:2.7. Further, the apparent density of obtained catalyst composition was 1.12 g/mL.

Comparative Preparation Example 2

Preparation of Catalyst Composition for the Synthesis of Carbon Nanotube

Catalyst 6 Fe:Al:Mg=2.4:4.9:2.7)

The Solution A has been prepared after adding 1,736 g of $Fe(NO_3)_3.9H_2O$, 3,337 g of $Al(NO_3)_3.9H_2O$ and 1,266 g of $Mg(NO_3)_2.6H_2O$ into 5 L of de-ionized water and stirring the mixture for 2 hours at room temperature. The Solution B has been prepared after adding 3,135 g of $NH_4.HCO_3$ into 10 L of de-ionized water and stirring the mixture for 2 hours at room temperature. Then, Solution A and Solution B have been mixed and stirred for 60 minutes in the room temperature. Obtained solid has been filtered and washed with de-ionized water. The recovered filter cake has been mixed and stirred again with 10 L of de-ionized water, and catalyst mixed solution has been prepared. Then, dried powder has been recovered by spray drying obtained catalyst mixed solution at 230° C. The dried powder has been calcinated for 4 hours at 600° C. under air atmosphere. Finally, 950 g of catalyst composition has been obtained. The molar ratio of metal used in catalyst composition was Fe:Al:Mg=2.4:4.9:2.7. Further, the apparent density of obtained catalyst composition was 0.8 g/mL.

Comparative Preparation Example 3

Preparation of Catalyst Composition for the Synthesis of Carbon Nanotube

Catalyst 7 (Fe:Al:Mg=2.4:4.9:2.7)

The catalytic metal precursor solution has been prepared after adding 1,736 g of $Fe(NO_3)_3.9H_2O$, 3,337 g of $Al(NO_3)_3.9H_2O$ and 133 g of MgO into 3 L of de-ionized water and stirring the mixture for 2 hours at room temperature. Then, obtained solid has been filtered and washed with de-ionized water. The recovered filter cake has been dried for 12 hours at 120° C. under air atmosphere. The dried filter cake has been crushed. Finally, 824 g of catalyst composition has been obtained. The molar ratio of metal used in catalyst composition was Fe:Al:Mg=2.4:4.9:2.7. Further, the apparent density of obtained catalyst composition was 0.92 g/mL.

Comparative Preparation Example 4

Preparation of Catalyst Composition for the Synthesis of Carbon Nanotube

Catalyst 8 (Fe:Al:Mg=2.4:4.9:2.7)

The catalytic metal precursor solution has been prepared after adding 3,472 g of $Fe(NO_3)_3.9H_2O$, 6,674 g of $Al(NO_3)_3.9H_2O$ and 2,531 g of $Mg(NO_3)_2.6H_2O$ into 10 L of de-ionized water and stirring the mixture for 2 hours at room temperature. Obtained catalytic metal precursor solution has been transferred by amount of 3 L/hour and sprayed into reactor by gas atomization method. Then, the pyrolysis of sprayed catalytic metal precursor solution has been made for 120 minutes continuously in the pyrolysis reactor. The pressure of air was 3 atm and the temperature of inner part of reactor was 400° C. The total amount of obtained catalyst composition was 620 g. The molar ratio of metal used in catalyst composition was Fe:Al:Mg=2.4:4.9:2.7. Further, the apparent density of obtained catalyst composition was 0.43 g/mL.

Comparative Preparation Example 5

Preparation of Catalyst Composition for the Synthesis of Carbon Nanotube

Catalyst 9 (Fe:Al:Mg=2.4:4.9:2.7)

The catalytic metal precursor solution has been prepared after adding 3,472 g of $Fe(NO_3)_3.9H_2O$, 6,674 g of $Al(NO_3)_3.9H_2O$ and 2,531 g of $Mg(NO_3)_2.6H_2O$ into 10 L of de-ionized water and stirring the mixture for 2 hours at room temperature. Obtained catalytic metal precursor solution has been transferred by amount of 3 L/hour and sprayed into reactor by gas atomization method. Then, the pyrolysis of sprayed catalytic metal precursor solution has been made for 120 minutes continuously in the pyrolysis reactor. The pressure of air was 1 atm and the temperature of inner part of reactor was 750° C. The total amount of obtained catalyst composition was 523 g. The molar ratio of metal used in catalyst composition was Fe:Al:Mg=2.4:4.9:2.7. Further, the apparent density of obtained catalyst composition was 0.32 g/mL.

Comparative Preparation Example 6

Preparation of Catalyst Composition for the Synthesis of Carbon Nanotube

Catalyst 10 (Fe:Al:Mg=2.4:4.9:2.7)

The catalytic metal precursor solution has been prepared after adding 3,472 g of $Fe(NO_3)_3 \cdot 9H_2O$, 6,674 g of $Al(NO_3)_3 \cdot 9H_2O$ and 2,531 g of $Mg(NO_3)_2 \cdot 6H_2O$ into 10 L of de-ionized water and stirring the mixture for 2 hours at room temperature. Obtained catalytic metal precursor solution has been transferred by amount of 3 L/hour and sprayed into reactor by gas atomization method. Then, the pyrolysis of sprayed catalytic metal precursor solution has been made for 120 minutes continuously in the pyrolysis reactor. The pressure of air was 7 atm and the temperature of inner part of reactor was 750° C. The total amount of obtained catalyst composition was 580 g. The molar ratio of metal used in catalyst composition was Fe:Al:Mg=2.4:4.9:2.7. Further, the apparent density of obtained catalyst composition was 0.37 g/mL.

Example

Synthesis of Carbon Nanotube

Carbon nanotube has been synthesized using catalyst composition prepared in Preparation Examples 1~4 in the fluidized bed reactor. After adding a certain amount of catalyst in the fluidized bed reactor, the reactor has been heated until desired temperature under nitrogen atmosphere. The mixed gas of ethylene and nitrogen (80/40 or 90/40) has been flowed into the reactor for 1 hour. A certain amount of hollow type of thin carbon nanotube has been prepared. Then, the educted amount of carbon has been measured in the room temperature.

The structure and shape of educted carbon has been analyzed using FE-SEM (Scanning Electron Microscope) and HR-TEM (Transmission Electron Microscope). The catalytic yield has been also calculated using the amount of added catalyst ($M_{cat}$) and the increased amount of carbon ($M_{total} - M_{cat}$). The equation for calculating catalytic yield was as follows. Catalytic yield (%)=100×($M_{total} - M_{cat}$)/$M_{cat}$.

Table 1 showed the results of carbon nanotube synthesis using the catalyst of present application. As shown in Table 1, the apparent density of catalyst composition was very low and the catalytic yield of present catalyst composition was in the range of 1,000~1,800%.

Comparative Example

Synthesis of Carbon Nanotube

Carbon nanotube has been synthesized using catalyst composition prepared in Comparative Preparation Examples 1~6 in the fluidized bed reactor. After adding a certain amount of catalyst in the fluidized bed reactor, the reactor has been heated until desired temperature under nitrogen atmosphere. The mixed gas of ethylene and nitrogen (80/40 or 90/40) has been flowed into the reactor for 1 hour. A certain amount of hollow type of thin carbon nanotube has been prepared. Then, the educted amount of carbon has been measured in the room temperature.

The structure and shape of educted carbon has been analyzed using FE-SEM (Scanning Electron Microscope) and HR-TEM (Transmission Electron Microscope). The catalytic yield has been also calculated using the amount of added catalyst ($M_{cat}$) and the increased amount of carbon ($M_{total} - M_{cat}$). The equation for calculating catalytic yield was as follows. Catalytic yield (%)=100×($M_{total} - M_{cat}$)/$M_{cat}$.

Table 2 showed the results of carbon nanotube synthesis using the catalyst of Comparative Preparation Examples 1~6. As shown in Table 2, the apparent density of catalyst composition prepared by co-precipitation method, spray drying method or the preparation method using solid oxide support (MgO) showed higher than that of prepared by spray pyrolysis method of present application.

On the other hand, the apparent density of catalyst composition prepared by Comparative Preparation Examples 4~6 in which the conditions of spray pyrolysis have been changed showed higher than that of prepared by spray pyrolysis method of present application, but lower than that of prepared by Comparative Preparation Examples 1~3.

The catalytic yield of catalyst composition prepared in Comparative Preparation Examples 1~6 was less than 800%, which is much lower than the catalytic yield of present catalyst composition in the range of 1,000~1,800%.

TABLE 1

The results of carbon nanotube synthesis using the catalyst of Preparation Examples 1~4

|  | Catalyst composition | Apparent density (g/mL) | Catalyst amount (g) | Reaction temp. (° C.) | Amount of reaction gas ($C_2H_4/N_2$, L/min.) | Reaction time (min.) | Catalytic yield (%) |
|---|---|---|---|---|---|---|---|
| Catalyst 1 | Fe:Al:Mg = 2.4:4.9:2.7 | 0.26 | 350 | 700 | 80/40 | 60 | 1,400 |
| Catalyst 2 | Fe:Al:Mg = 3.2:6.6:0.2 | 0.073 | 300 | 700 | 90/40 | 60 | 1,041 |
| Catalyst 3 | Fe:Al:Co:Mg = 2.1:4.5:0.6:2.8 | 0.23 | 300 | 700 | 90/40 | 60 | 1,121 |
| Catalyst 4 | Fe:Al:Mo:Mg = 3.1:6.3:0.4:0.2 | 0.073 | 300 | 700 | 90/40 | 60 | 1,397 |

TABLE 2

The results of carbon nanotube synthesis using the catalyst of Comparative Preparation Examples 1~6

| | Catalyst composition | Apparent density (g/mL) | Catalyst amount (g) | Reaction temp. (° C.) | Amount of reaction gas ($C_2H_4/N_2$, L/min.) | Reaction time (min.) | Catalytic yield (%) |
|---|---|---|---|---|---|---|---|
| Catalyst 5 | Fe:Al:Mg = 2.4:4.9:2.7 | 1.12 | 350 | 700 | 80/40 | 60 | 627 |
| Catalyst 6 | Fe:Al:Mg = 2.4:4.9:2.7 | 0.8 | 300 | 700 | 80/40 | 60 | 406 |
| Catalyst 7 | Fe:Al:Mg = 2.4:4.9:2.7 | 0.92 | 300 | 700 | 90/40 | 60 | 514 |
| Catalyst 8 | Fe:Al:Mg = 2.4:4.9:2.7 | 0.43 | 300 | 700 | 80/40 | 60 | 538 |
| Catalyst 9 | Fe:Al:Mg = 2.4:4.9:2.7 | 0.32 | 300 | 700 | 80/40 | 60 | 736 |
| Catalyst 10 | Fe:Al:Mg = 2.4:4.9:2.7 | 0.37 | 300 | 700 | 80/40 | 60 | 645 |

Remarks: The catalyst 5 has been prepared according to co-precipitation method. The catalyst 6 has been prepared according to spray drying method. The catalyst 7 has been prepared using solid oxide support (MgO). The catalyst 8 has been prepared according to spray pyrolysis method after changing the temperature into 400° C. The catalyst 9 has been prepared according to spray pyrolysis method after changing the pressure into 1 atm. The catalyst 10 has been prepared according to spray pyrolysis method after changing the pressure into 7 atm.

What is claimed is:

1. A process for preparing catalyst composition having the apparent density of 0.01-0.50 g/ml for the synthesis of carbon nanotube in a high yield of 1,000-1,800% comprising the steps of:
   i) dissolving multi-component metal precursors of catalyst composition in deionized water; ii) spraying obtained catalytic metal precursor solution into the high temperature reactor by gas atomization method using 2-5 atm pressure of air; iii) forming the catalyst composition powder by pyrolysis of gas atomized material at the temperature in the range of 600-1,200° C.; and iv) obtaining the catalyst composition powder,
   wherein said catalyst composition is represented by following formula $[Fe_a:Al_b]_x:M_y:Mg_z$;

wherein
   Fe represents catalytic metal of iron or its oxide;
   Al represents catalytic metal of aluminum or its oxide;
   Mg represents inactive support of magnesium or its oxide;
   M represents at least one transition metal selected from Co, Ni, Cr, Mn, Mo, W, V, Sn, or Cu or its oxide;
   x, y, and z represent molar fraction of [the sum of Fe and Al], M, and Mg,
   wherein x+y+z=10, 2.0≤x≤8.0, 0.0≤y≤2.5, 0.5≤z≤8.0;

a and b represent molar fraction of Fe and Al;
   a+b=10, 2.0≤a≤5.5, 4.5≤b≤8.0; and
   wherein said metal precursor is at least one selected from nitrate, sulfate, alkoxide and/or carbonate form of metal.

2. The process for preparing catalyst composition according to claim 1, wherein said pyrolysis is performed at the temperature in the range of 600-1,000° C.

3. The process for preparing catalyst composition according to claim 1, wherein said pyrolysis is performed at the pressure of spray gas in the range of 2-4 atm and the spray gas is air.

4. The process for preparing catalyst composition according to claim 1, wherein apparent density of catalyst composition is in the range of 0.03-0.40 g/ml.

* * * * *